US010590766B2

(12) United States Patent
de Sousa et al.

(10) Patent No.: US 10,590,766 B2
(45) Date of Patent: Mar. 17, 2020

(54) CUTTING HEAD HAVING SEGMENTED CUTTING DISC (71) Applicant: Joy MM Delaware, Inc., Wilmington, DE (US)

(72) Inventors: Joaquim Antonio Soares de Sousa, Gauteng (ZA); Michael Laing, Gauteng (ZA)

(73) Assignee: Joy Global Underground Mining LLC, Warrendale, PA (US)

( * ) Notice: Subject to any disclaimer, the term of this patent is extended or adjusted under 35 U.S.C. 154(b) by 106 days.

(21) Appl. No.: 15/606,745

(22) Filed: May 26, 2017

(65) Prior Publication Data
US 2017/0342830 A1 Nov. 30, 2017

Related U.S. Application Data (60) Provisional application No. 62/342,438, filed on May 27, 2016, provisional application No. 62/342,254, (Continued)

(51) Int. Cl.
E21C 25/00 (2006.01)
E21C 25/06 (2006.01)
E21C 27/02 (2006.01)
E02F 9/28 (2006.01)
E21B 3/02 (2006.01)
E21C 25/18 (2006.01)
E02F 5/20 (2006.01)
E21B 3/03 (2006.01)
(Continued)

(52) U.S. Cl.
CPC .............. E21C 25/06 (2013.01); E02F 5/20 (2013.01); E02F 9/2866 (2013.01); E21B 3/02 (2013.01); E21B 3/03 (2013.01); E21C 25/18 (2013.01); E21C 27/02 (2013.01); E21D 9/102 (2013.01); B26D 2001/0046 (2013.01); E02F 5/18 (2013.01); E21C 27/16 (2013.01); E21C 31/02 (2013.01); E21D 9/1013 (2013.01)

(58) Field of Classification Search
CPC .......... E21C 25/06; E21C 25/18; E21C 27/02; E21C 27/16; E21C 31/02
USPC .................................................. 175/412, 413
See application file for complete search history.

(56) References Cited

U.S. PATENT DOCUMENTS 2,121,202 A 6/1938 Killgore
2,763,258 A 9/1956 Hughes
(Continued)

FOREIGN PATENT DOCUMENTS

JP 2007169947 7/2007

OTHER PUBLICATIONS

International Search Report and Written Opinion for Application No. PCT/US2017/034738 dated Aug. 25, 2017 (15 pages).

(Continued)

Primary Examiner — Janine M Kreck
(74) Attorney, Agent, or Firm — Michael Best & Friedrich LLP (57) ABSTRACT A cutting device for engaging a rock face includes a disc body supported for rotation about an axis of rotation, and a plurality of peripheral portions removably secured to the disc body. Each of the peripheral portions including a plurality of cutting bits positioned on a peripheral edge. The peripheral edge of each peripheral portion is aligned with the peripheral edges of adjacent peripheral portions.

19 Claims, 13 Drawing Sheets

Related U.S. Application Data filed on May 27, 2016, provisional application No. 62/446,799, filed on Jan. 16, 2017.

(51) Int. Cl.
*E21D 9/10* (2006.01)
*E02F 5/18* (2006.01)
*B26D 1/00* (2006.01)
*E21C 27/16* (2006.01)
*E21C 31/02* (2006.01)

(56) References Cited

U.S. PATENT DOCUMENTS

| | | | |
|---|---|---|---|
| 3,048,160 A | 8/1962 | Griffin et al. | |
| 3,411,826 A | 11/1968 | Wallers et al. | |
| 3,461,983 A | 8/1969 | Hudson et al. | |
| 3,536,150 A * | 10/1970 | Stebley | E21B 4/06 |
| | | | 175/263 |
| 3,633,637 A | 1/1972 | Kolesh | |
| 3,647,265 A * | 3/1972 | Pentith | E21C 25/10 |
| | | | 175/435 |
| 3,952,815 A | 4/1976 | Dysart | |
| 4,109,737 A | 8/1978 | Bovenkerk | |
| 4,202,419 A | 5/1980 | Youngblood | |
| 4,466,498 A * | 8/1984 | Bardwell | E21B 10/56 |
| | | | 175/413 |
| 4,527,641 A * | 7/1985 | Klemm | E21B 4/16 |
| | | | 173/78 |
| 4,751,972 A | 6/1988 | Jones et al. | |
| 4,755,004 A | 7/1988 | Palmquist | |
| 4,838,366 A | 6/1989 | Jones | |
| 5,060,735 A | 10/1991 | Agren | |
| 5,129,296 A | 7/1992 | Wayne | |
| 5,139,099 A * | 8/1992 | Hayashi | E21B 10/327 |
| | | | 175/292 |
| 5,143,163 A | 9/1992 | Stiffler et al. | |
| 5,291,807 A | 3/1994 | Vanderford et al. | |
| 5,551,760 A | 9/1996 | Sollami | |
| 5,722,497 A | 3/1998 | Gum et al. | |
| 5,884,979 A | 3/1999 | Latham | |
| 6,145,605 A | 11/2000 | Karlsson | |
| 6,260,637 B1 | 7/2001 | Haussmann et al. | |
| 6,290,008 B1 | 9/2001 | Portwood et al. | |
| 6,343,842 B1 * | 2/2002 | Sauer | E21B 10/10 |
| | | | 175/373 |
| 6,367,569 B1 | 4/2002 | Walk | |
| 6,561,590 B2 | 5/2003 | Sugden | |
| 6,692,083 B2 | 2/2004 | Latham | |
| 6,766,870 B2 | 7/2004 | Overstreet | |
| 7,240,746 B2 | 7/2007 | Overstreet et al. | |
| 7,338,135 B1 | 3/2008 | Hall et al. | |
| 7,770,664 B2 | 8/2010 | Laird et al. | |
| 8,007,049 B2 | 8/2011 | Fader et al. | |
| 8,016,056 B2 | 9/2011 | Viswanadham et al. | |
| 8,522,899 B2 | 9/2013 | Bouaphanh | |
| 8,523,288 B2 | 9/2013 | Hanaoka et al. | |
| 8,777,326 B2 | 7/2014 | Hall | |
| 9,062,502 B2 | 6/2015 | King | |
| 9,803,476 B2 * | 10/2017 | Raschka | E21C 27/24 |
| 2006/0061206 A1 | 3/2006 | Nava | |
| 2008/0036279 A1 | 2/2008 | Hall et al. | |
| 2010/0104382 A1 | 4/2010 | Heinloth | |
| 2012/0198671 A1 | 8/2012 | Meidar et al. | |
| 2013/0014999 A1 | 1/2013 | King | |
| 2013/0181501 A1 | 7/2013 | Hall et al. | |
| 2015/0030397 A1 | 1/2015 | Heinloth | |
| 2017/0342829 A1 | 11/2017 | de Sousa et al. | |
| 2017/0342835 A1 | 11/2017 | de Sousa et al. | |

OTHER PUBLICATIONS

International Search Report and Written Opinion for Application No. PCT/US2017/034729 dated Aug. 25, 2017 (15 pages).
International Search Report and Written Opinion for Application No. PCT/US2017/034713 dated Aug. 25, 2017 (13 pages).

* cited by examiner

CUTTING HEAD HAVING SEGMENTED CUTTING DISC

CROSS-REFERENCE TO RELATED APPLICATIONS

This application claims the benefit of prior-filed, U.S. Provisional Application No. 62/342,438, filed May 27, 2016, U.S. Provisional Application No. 62/342,254, filed May 27, 2016, and U.S. Provisional Patent Application No. 62/446,799, filed Jan. 16, 2017. The entire contents of these documents are incorporated by reference herein.

BACKGROUND

The present disclosure relates to machines for mining or excavating rock, and more particularly to a cutting mechanism for mining or excavating rock.

Mining machines may incorporate a cutting disc for cutting and removing rock and/or mineral. The cutting disc may be rotated and driven to undercut the rock face at a narrow angle to generate shearing forces to cause the rock to fracture. The cutting disc has a plurality of bits or buttons positioned on a periphery of the disc.

SUMMARY

In one aspect, a cutting device for engaging a rock face includes a disc body supported for rotation about an axis of rotation, and a plurality of peripheral portions removably secured to the disc body. Each of the peripheral portions including a plurality of cutting bits positioned on a peripheral edge. The peripheral edge of each peripheral portion is aligned with the peripheral edges of adjacent peripheral portions.

In another aspect, a cutting head for engaging a rock wall includes a boom configured to be supported on a frame, a drive mechanism, and a cutting device supported on the boom and driven by the drive mechanism. The cutting device includes a disc body supported for rotation about an axis of rotation, and a plurality of peripheral portions removably secured to the disc body. Each of the peripheral portions includes a plurality of cutting bits positioned on a peripheral edge. The peripheral edge of each peripheral portion is aligned with the peripheral edges of adjacent peripheral portions.

In yet another aspect, a cutting device for engaging a rock face includes a disc body supported for rotation about an axis of rotation, and a cutting member supported on the disc body. The cutting member includes a peripheral edge and a plurality of cutting bits positioned along the peripheral edge, and the peripheral edge has a round shape. The cutting member is formed as a plurality of cutting portions independently and removably secured to the disc body, each of the cutting portions supporting some of the cutting bits.

In still another aspect, a method is provided for servicing a cutting device for a mining machine. The cutting device includes a plurality of cutting portions supported on a disc body, and each cutting portion includes a plurality of cutting bits positioned along a peripheral edge. The method includes uncoupling one of the cutting portions from the disc body, and securing a replacement cutting portion to the disc body in a position previously occupied by the one cutting portion.

Other features and aspects will become apparent by consideration of the following detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

DETAILED DESCRIPTION

Figure 1:
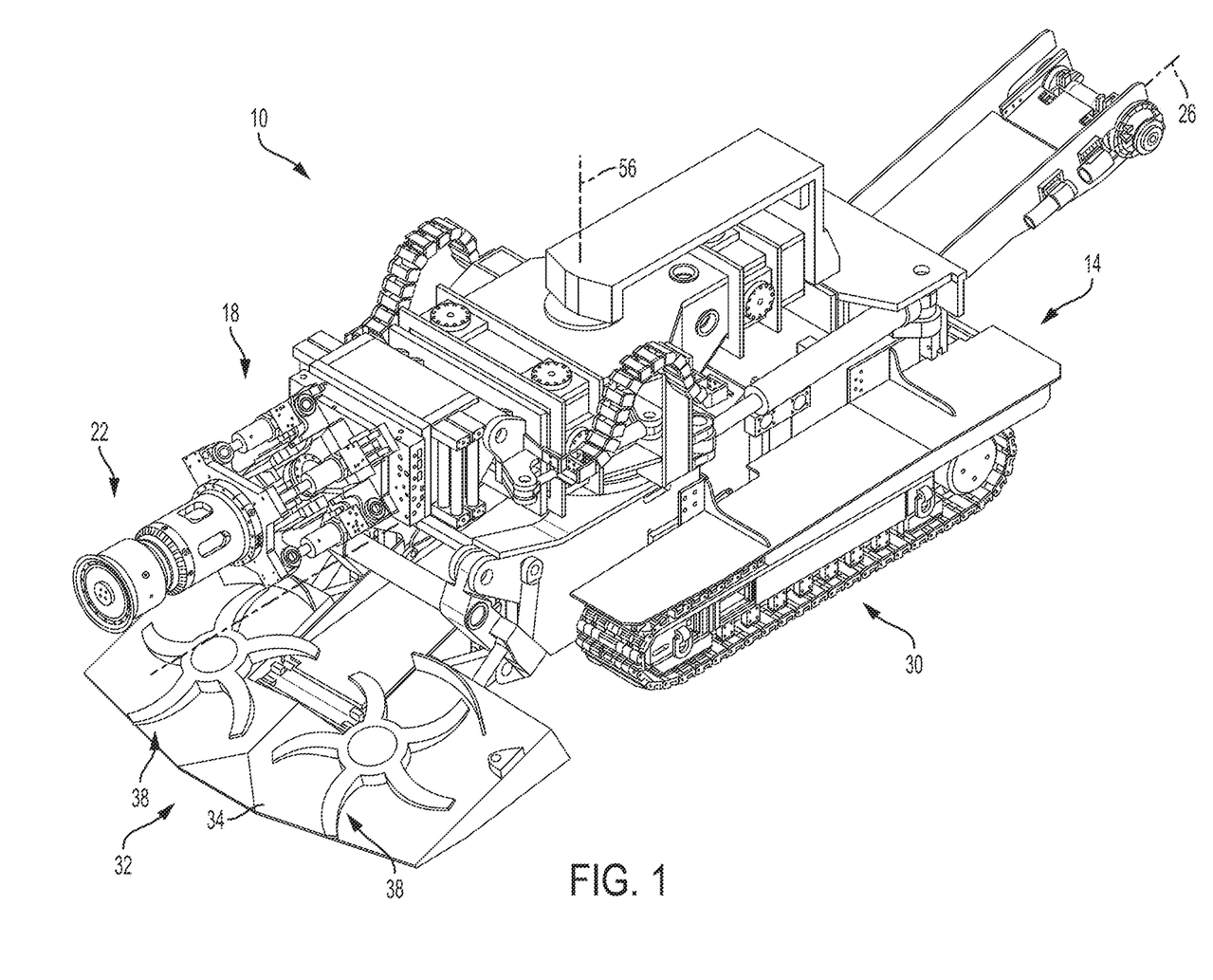
FIG. 1 is a perspective view of a mining machine.

FIG. 1 illustrates a mining machine 10 (e.g., an entry development machine) including a frame or chassis 14, a boom 18, and a cutting head 22 supported on the boom 18 for engaging and removing rock from a rock face (not shown). The chassis 14 is supported on a drive system including traction devices, such as crawlers or tracks 30 for moving the chassis 14 over a support surface or floor. The chassis 14 includes a first or forward end and a second or rear end, and a longitudinal chassis axis 26 extends between the forward end and the rear end. In the illustrated embodiment, the chassis 14 further includes a gathering head 32 positioned adjacent the mine floor proximate the cutting head 22. The gathering head 32 includes a deck 34 and rotating members 38 that direct cut material from the deck 34 onto a conveyor 42. In some embodiments, the chassis 14 may also include arms for directing cut material onto the deck 34. In the illustrated embodiment, the mining machine 10 includes a single cutting head; in other embodiments, the machine 10 may include multiple cutting heads.

In some embodiments, the boom 18 may be supported on the chassis 14 by a turntable or swivel joint that is rotatable about a swivel axis 56 perpendicular to the chassis axis 26 (e.g., a vertical axis perpendicular to the support surface) to pivot the boom 18 in a plane that is generally parallel the chassis axis 26 (e.g., a horizontal plane parallel to the support surface).

Figure 2:
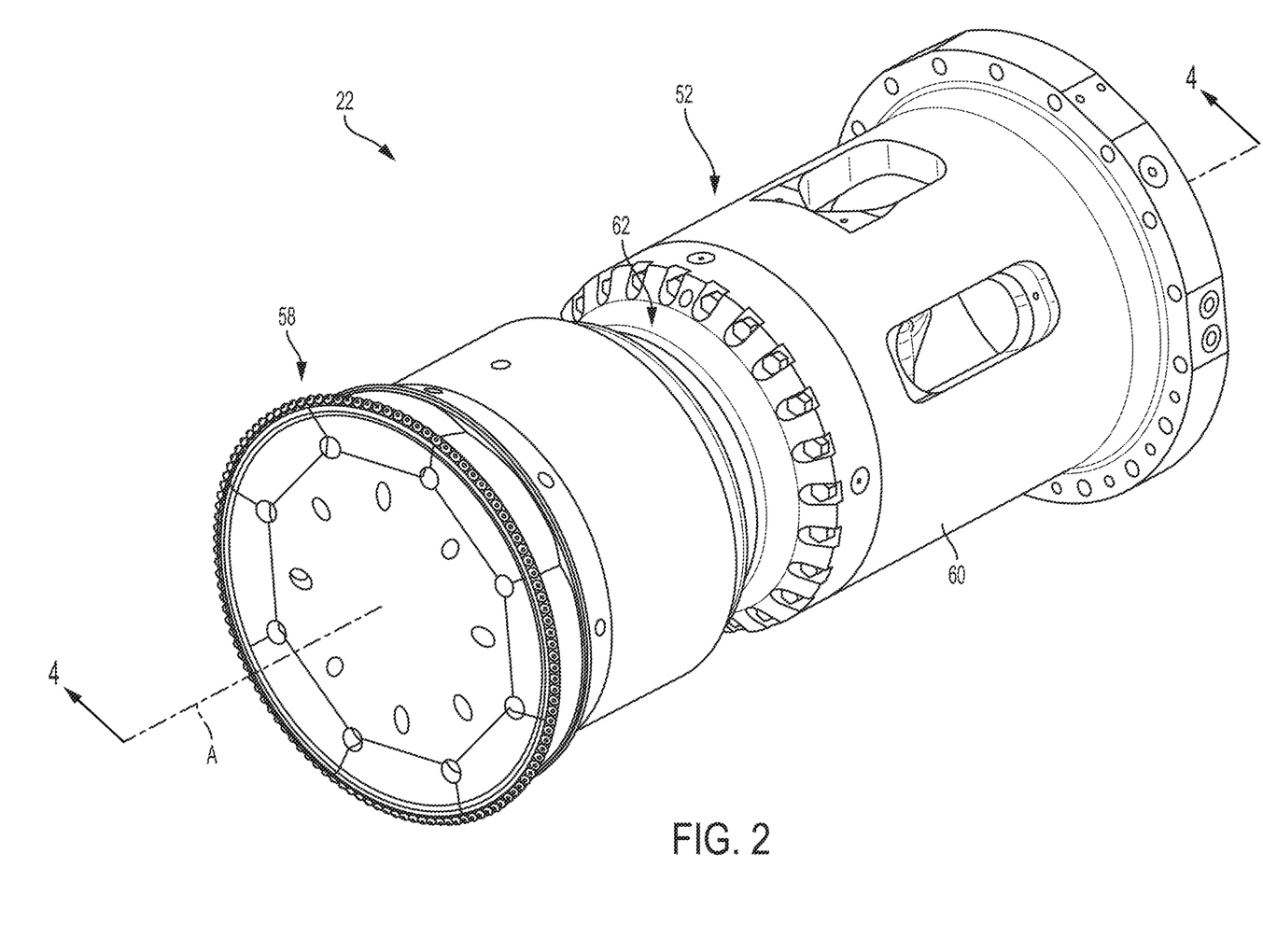
FIG. 2 is a perspective view of a cutting head.
Figure 3:
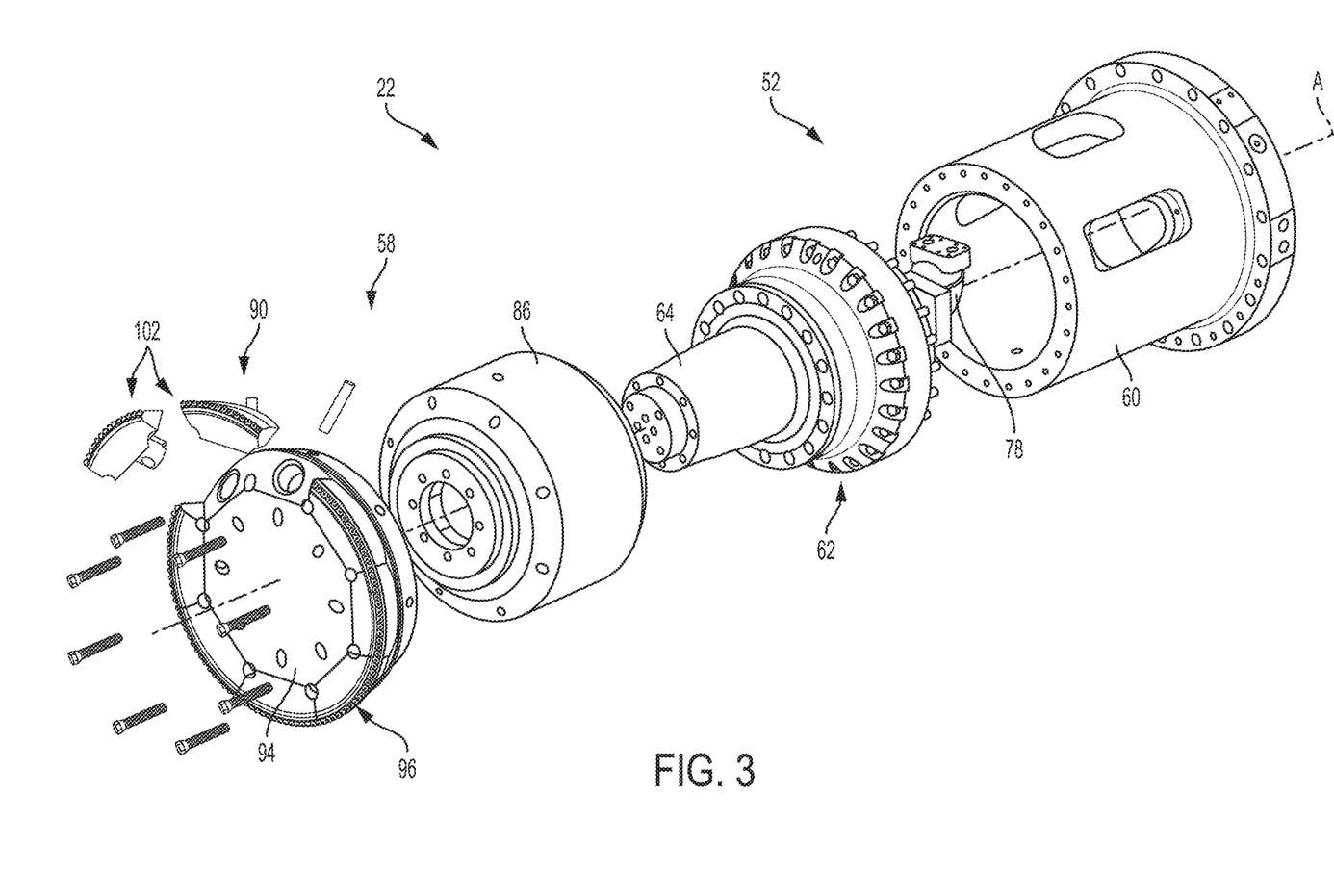
FIG. 3 is an exploded view of the cutting head of FIG. 2.
Figure 4:
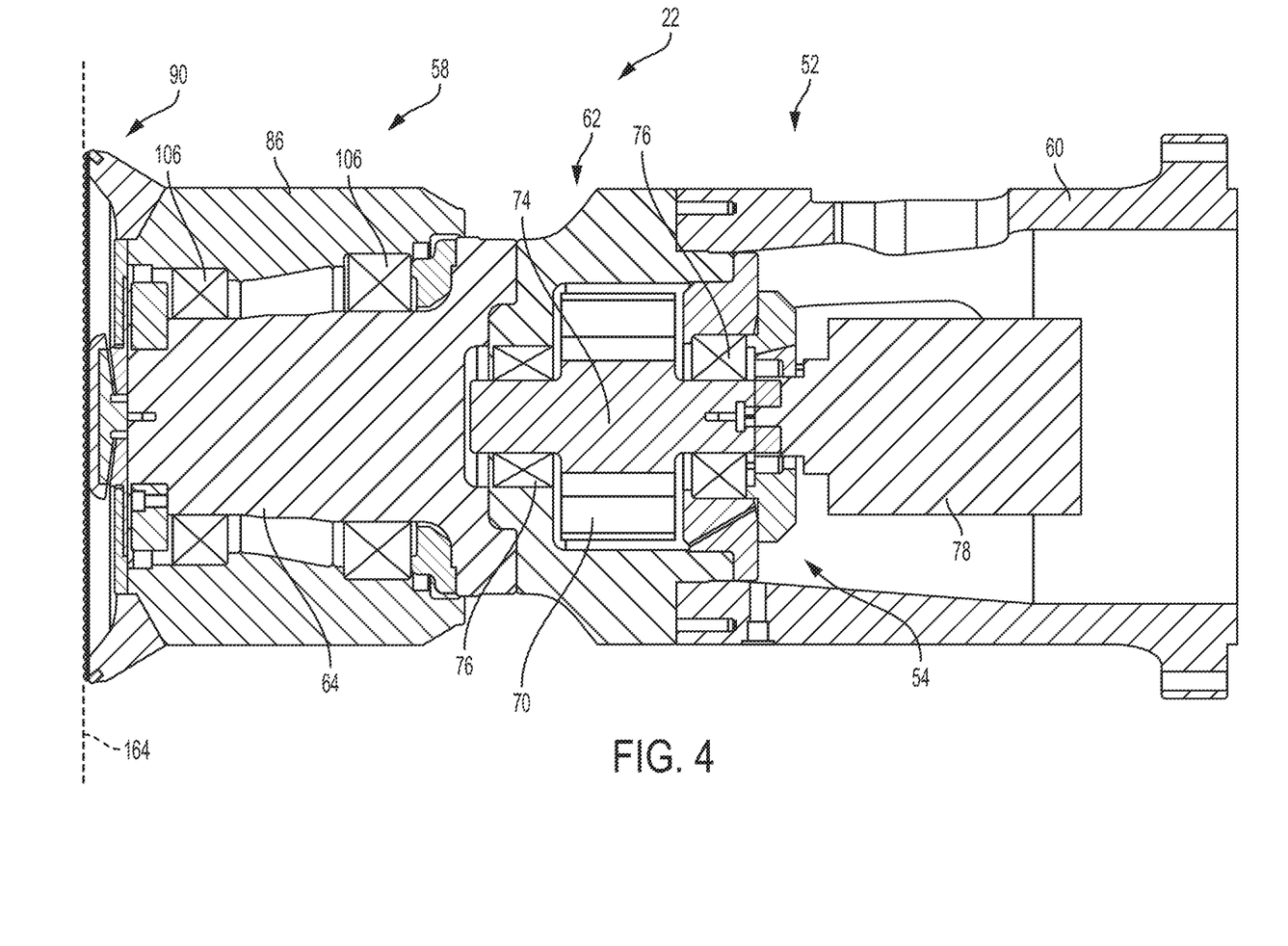
FIG. 4 is a cross-section view of the cutting head of FIG. 2, viewed along section 4-4.

As shown in FIGS. 2-4, the cutting head 22 includes a housing 52 coupled to the end of the boom 18 (FIG. 1), an exciter assembly 54 (FIG. 4), and a cutting disc assembly 58. The cutting head 22 extends along a cutting head axis A. In the illustrated embodiment, the housing 52 includes a cylindrical portion 60 and an arm 62 is coupled to an end of the cylindrical portion 60. In the illustrated embodiment, the arm 62 includes a mounting portion or shaft 64 (FIGS. 3 and 4) supporting the cutting disc assembly 58. As shown in FIG. 4, in the illustrated embodiment the exciter assembly 54 includes an eccentric exciter mass 70 coupled to a shaft 74 supported for rotation (e.g., by bearings 76) within the arm 62, and a motor 78 for mechanically driving the shaft 74 and exciter mass 70 to rotate. Rotation of the exciter mass 70 causes the cutting head 22 (including the cutting disc assembly 58) to oscillate. In the illustrated embodiment, the cutting disc assembly 58 is supported for free rotation.

In some embodiments, the cutting disc assembly 58 is driven to rotate about the longitudinal axis A, and the longitudinal axis A oscillates from a fixed wrist joint. In some embodiments, the cutting head and disc may operate in a manner similar to that of the mining machine disclosed in U.S. Patent Application Publication No. 2014/0077578, filed Sep. 16, 2013, the entire contents of which are incorporated by reference herein. In other embodiments, the cutting head and disc operates in a similar manner to the cutting mechanism disclosed in U.S. Pat. No. 7,934,776, published May 3, 2011, the entire contents of which are incorporated by reference herein. In other embodiments, the cutting disc may be is driven to rotate in another manner.

Figure 5:
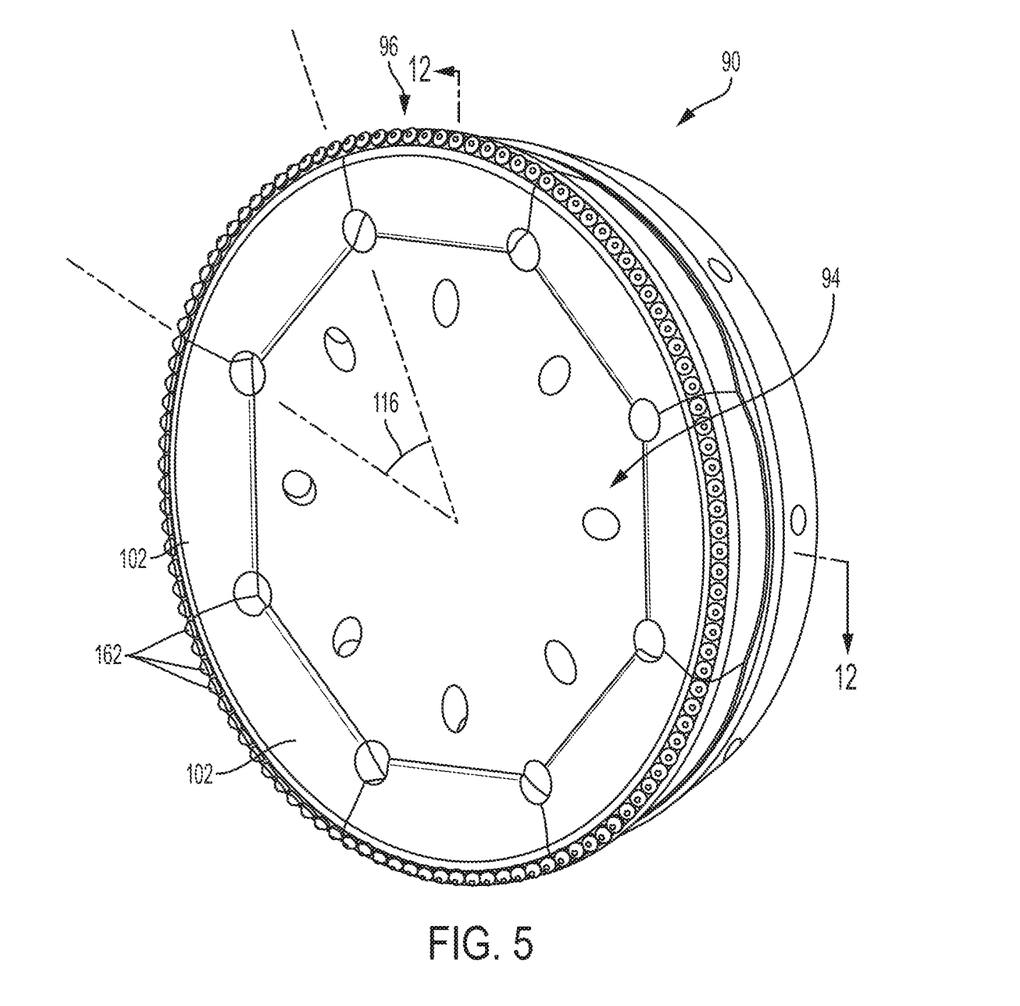
FIG. 5 is a perspective view of a cutting disc.

Referring to FIGS. 3 and 5, the cutting disc assembly 58 includes a carrier 86 (FIG. 3) and a cutting disc 90 including a body or main support 94 and a cutting member or cutting ring 96 supported on the main support 94. In the illustrated embodiment, the main support 94 is coupled to an end of the carrier 86 via a tapered interface, and is retained in place via a bolted connection. In other embodiments, other types of connections (e.g., fasteners, retaining pins, locking plates, etc.) may be used in place of the bolted connection. In the illustrated embodiment, the carrier 86 is supported for free rotation relative to the shaft 64 by bearings 106 (FIG. 4—e.g., roller bearings). The cutting disc assembly 58 is neither prevented from rotating nor positively driven to rotate except by the induced oscillation caused by the exciter mass 70 and/or by the reaction forces exerted on the cutting head 22 by the rock face. The cutting member 96 includes a plurality of independently removable peripheral portions or cutting segments 102.

Figure 6:
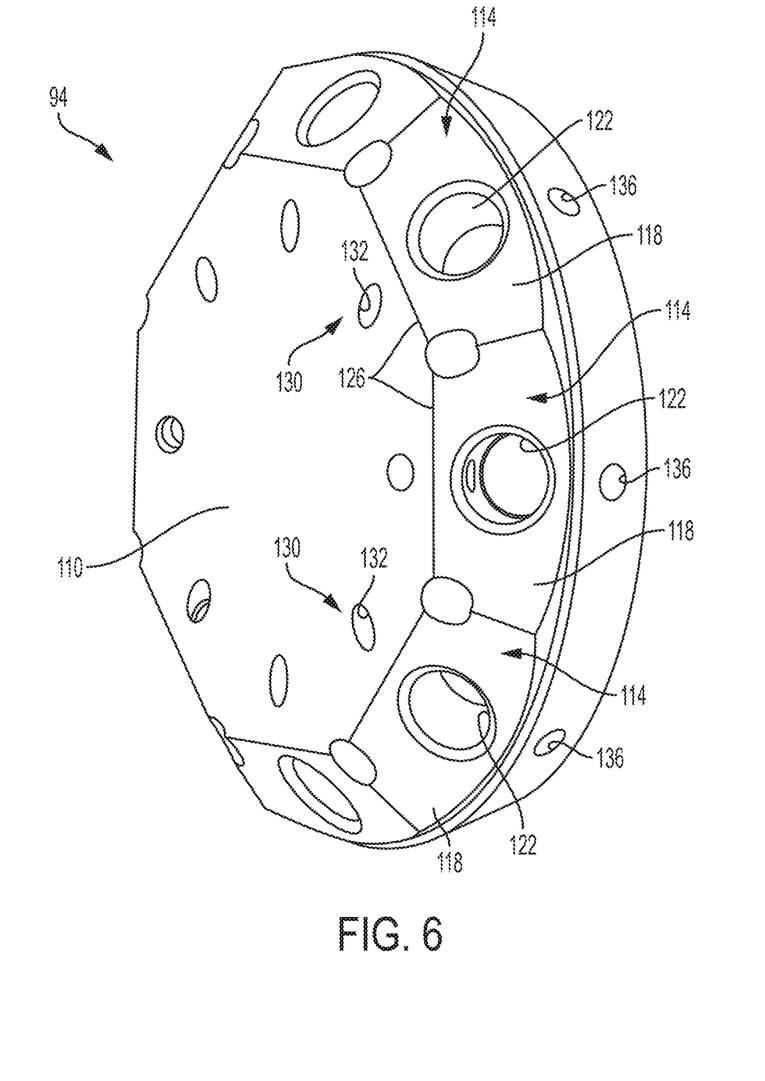
FIG. 6 is a perspective view of a main support of the cutting disc of FIG. 5.

Referring to FIG. 6, the main support 94 includes a planar end surface 110 and a plurality of segment-receiving portions 114 positioned along a perimeter. In the illustrated embodiment, each segment-receiving portion 114 is defined by a generally planar surface 118 oriented at an angle relative to the end surface 110. Each segment-receiving portion 114 includes a slot 122 extending at least partially through the planar surface 118 and oriented orthogonally relative to the planar surface 118. Each of the segment-receiving portions 114 is bounded by a shoulder 126 defined at an intersection of the segment receiving portion 114 and the end surface 110.

In the illustrated embodiment, the main support 94 includes eight segment receiving portions 114 positioned along the perimeter, and each of the segment-receiving portions 114 has an equal size and shape to the other portions 114. Accordingly, the main support 94 can receive an equivalent number of cutting segments 102 (i.e., eight cutting segments 102). As shown in FIG. 5, each cutting segment 102 extends through an angle 116 about an axis of the disc 90. In the illustrated embodiment, each cutting segment 102 extends through an angle of approximately 45 degrees; in other embodiments, the cutting member 96 may include a different number of segments, and the segments may extend through an angle between approximately 30 degrees and approximately 120 degrees.

In other embodiments, the main support may include fewer or more segment-receiving portions, and the number of cutting segments is equivalent to the number of segment receiving portions. In addition, aspects of the segment-receiving portions 114, including the planar surfaces 118 and the slots 122, may vary in size and/or shape, and may also vary in size and/or shape with respect to one another (i.e., one segment receiving portion may be different from one or more other segment receiving portions; one cutting segment may be different from one or more other cutting segments).

Referring again to FIG. 6, the main support 94 also includes retention features 130. In the illustrated embodiment, the retention features 130 are disposed on the end surface 110, and each retention feature 130 includes a bore 130a extending through the main support 94 at an angle relative to the end surface 110 in a direction approximately parallel to the planar surface 118 of a corresponding segment receiving portion 114. Stated another way, in the illustrated embodiment, each bore 130a intersects an associated cutting segment-receiving slot 122 and is oriented orthogonally with respect to the slot 122. In the illustrated embodiment, the bore 130a includes a first opening 132 on the end surface 110 and a second opening 136 on a peripheral surface of the main support 94.

The main support 94 may also include channels or conduits (not shown) that are fluidly coupled to a fluid source disposed on or remotely from the mining machine to convey a fluid to the cutting disc 90. The delivery of the fluid may provide lubrication and/or reduce thermal loading. The conduits may dispense fluid onto and/or around the cutting segments 102 to lubricate and cool the portions of the cutting disc 90 that engage the rock face.

Figure 7A:
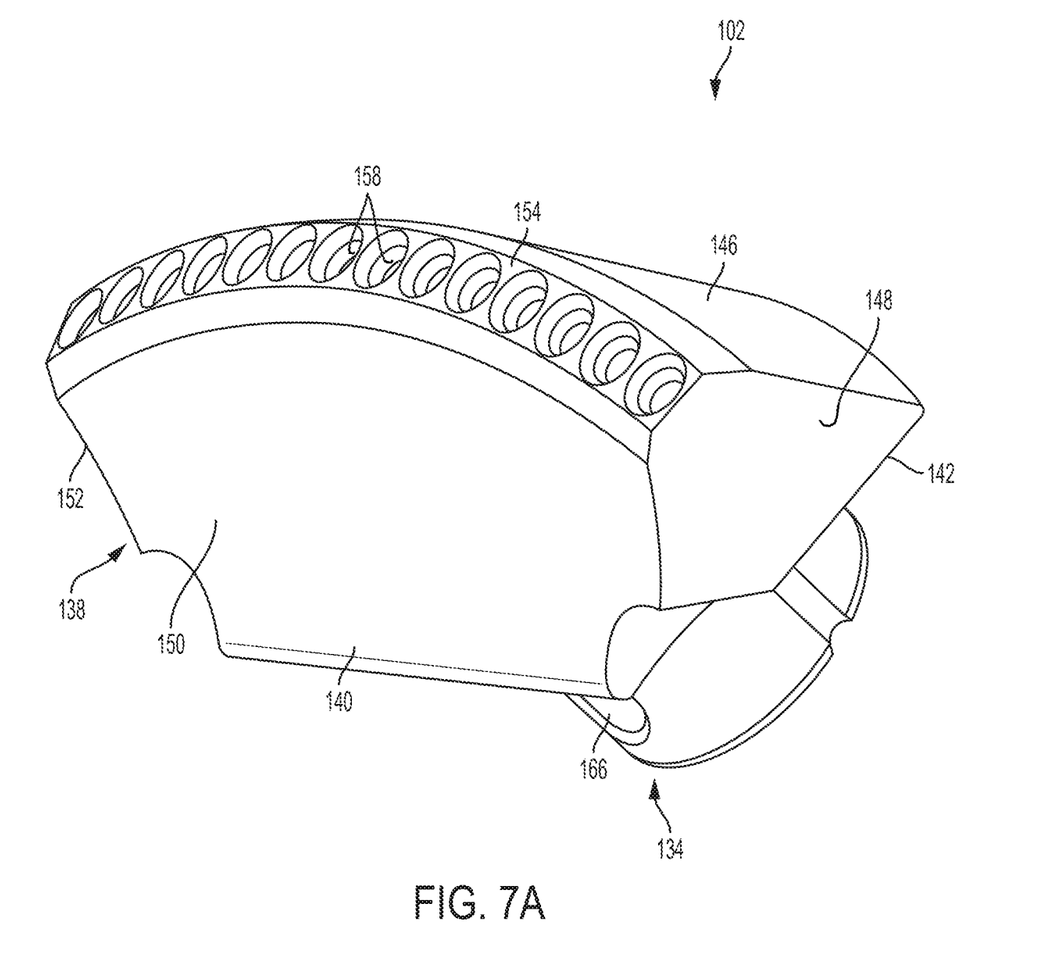
FIG. 7A is a first perspective view of a cutting segment.
Figure 7B:
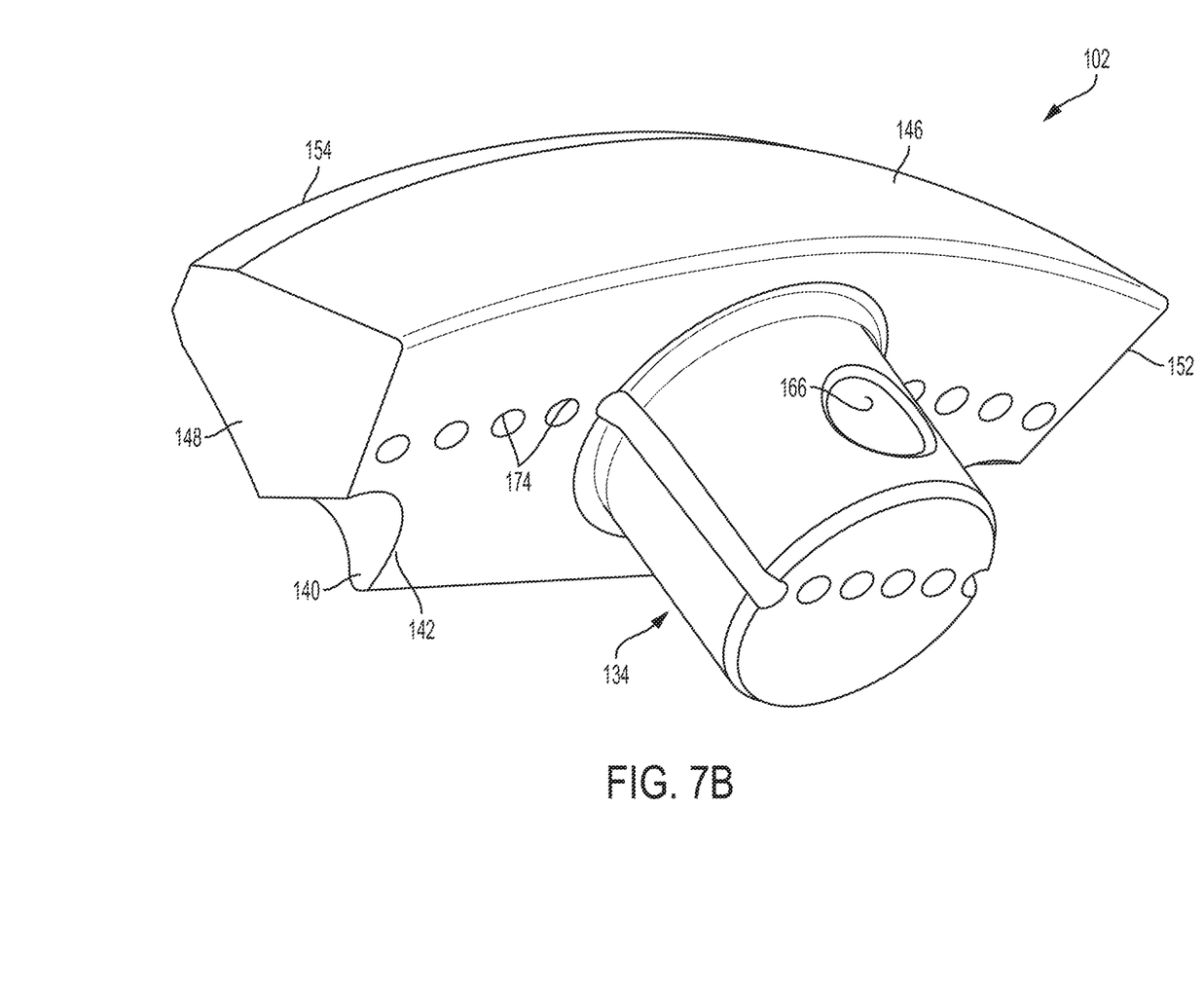
FIG. 7B is a second perspective view of the cutting segment of FIG. 7A.

With reference to FIGS. 7A and 7B, each cutting segment 102 includes a coupling protrusion 134 extending from a body 138. The body 138 includes a lower surface 142, an outer wall 146, and a sloped inner wall 150. The outer wall 146 and the sloped inner wall 150 extend towards one another and meet at a peripheral edge or rim 154. An inner portion of the body 138 includes a lip or ledge 140 for engaging a shoulder 126 of the main support 94. The rim 154 includes bores 158 (FIG. 7A) extending into the body 138. The body 138 further includes a first end surface 148 and a second end surface 152. The cutting segments 102 are positioned around a perimeter of the main support 94 in an end-to-end relationship, such that a first end surface 148 of one segment 102 is positioned adjacent a second end surface 152 of an adjacent segment 102. The rims 154 of adjacent cutting segments 102 are aligned, thereby providing a substantially continuous cutting edge around the perimeter of the main support 94 (that is, the cutting edge is continuous except for gaps that may occur at the interfaces between adjacent cutting segments 102).

Figure 8:
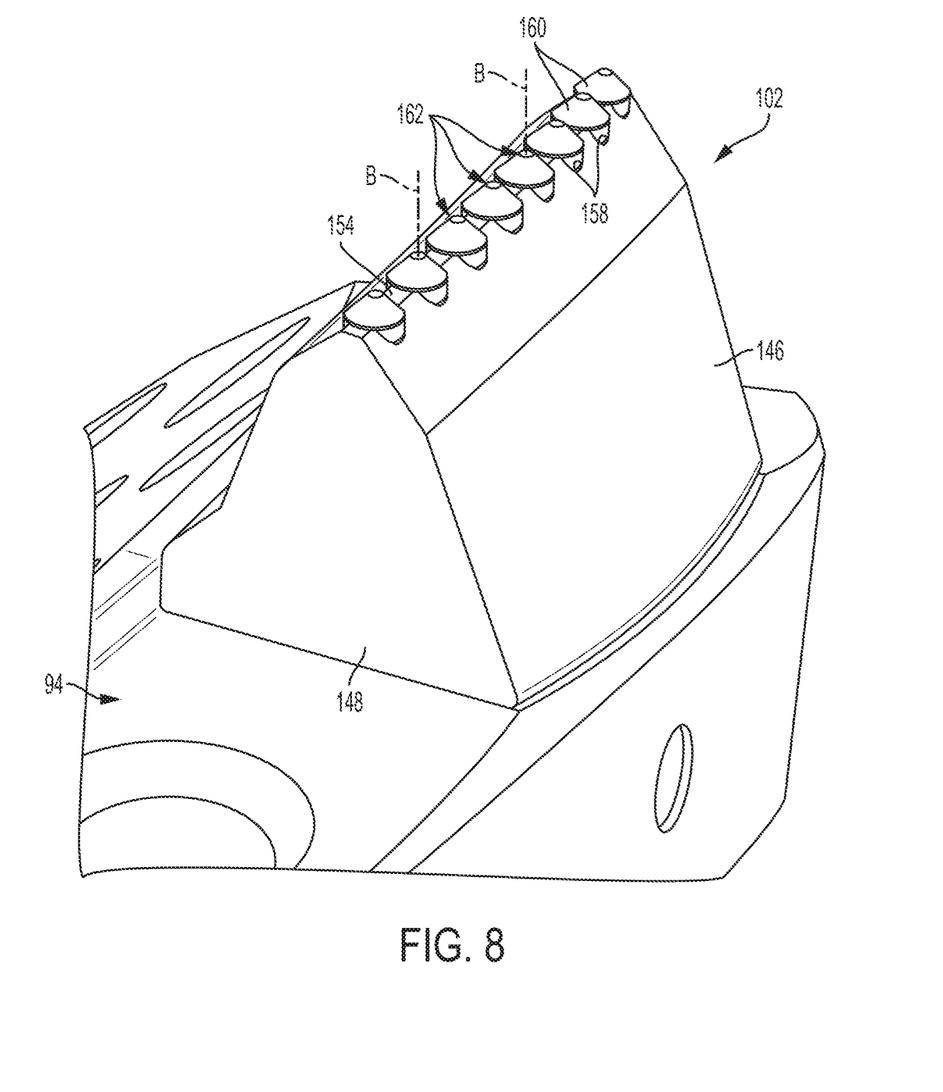
FIG. 8 is an enlarged perspective view of the cutting segment secured to the main support of FIG. 5.

As shown in FIG. 8, each bore 158 receives a cutting button or cutting bit 162. The cutting bits 162 are positioned in a cutting plane 164 (FIG. 4). The cutting bits 162 may be formed from a material having a high hardness (e.g., carbide). In the illustrated embodiment, the rim 154 of each cutting segment 102 includes approximately fourteen bores 158 spaced at regular intervals; in other embodiments, the rim 154 may include fewer or more bores 158, and/or the bores 158 may be spaced irregularly along the rim 154. In an exemplary embodiment, each bore 158 may be configured to receive a cutter button as described in U.S. Provisional Patent Application No. 62/342,254, filed on May 27, 2016. Each cutting bit 162 may include a main portion (not shown) positioned in the bore 158 and an end portion 160 having a cutting formation (e.g., an edge or tip). The end portion protrudes from the bore 158 to engage the rock face. The cutting formations can be oriented at an angle relative to the axis of rotation of the cutting disc assembly 58.

In yet another exemplary embodiment, the rim 154 may include multiple types or sizes of bores configured to receive different types of cutting bits 162 or wear elements. The bores can be spaced apart or alternated, or alternatively placed on different surfaces of the cutting segment. The wear elements may be, for example, substantially similar to the wear buttons described in U.S. Provisional Patent Application No. 62/342,438, filed on May 27, 2016.

As shown in FIG. 7B, each cutting segment 102 is retained or secured to the main support 94 by the coupling protrusion 134. The coupling protrusion 134 is positioned in one of the cutter segment-receiving slots 122 (FIG. 6) of the main support 94. In the illustrated embodiment, the coupling protrusion 134 is generally cylindrical. The coupling protrusion 134 extends from the lower surface 142 of the cutting segment 102, and an aperture 166 extends transversely through the coupling protrusion 134.

The cutting segment 102 further includes a plurality of extraction holes 174 disposed on the lower surface 142 that are in operative communication with the bores 158. In the illustrated embodiment, the extraction holes 174 are aligned with the bores 158 such that individual cutter bits 162 may be removed from the bores 158 using the extraction holes 174. The extraction holes 174 are also a smaller diameter than the bores 158 such that the cutter bits 162 are securely retained within the bores 158 without being over-inserted or compacted into the extraction holes 174. In other embodiments, the extraction holes 174 may have a different diameter and/or the extraction holes 174 may be disposed at a different location on the cutting segment 102. In still other embodiments, the bore 158 may be blind bores without extraction holes. For example, the bores 158 may be machined to a predetermined depth without being in communication with openings on an opposite side of the cutting segment.

In the illustrated embodiment, each cutting segment 102 is similar to the others. In other embodiments, the cutting segments may be different. For example, the cutting segments may be constructed from different materials, have different geometries, and/or may include different numbers and types of cutting buttons. Also, the cutting segments may be secured to the main support 94 in another manner.

Figure 9:
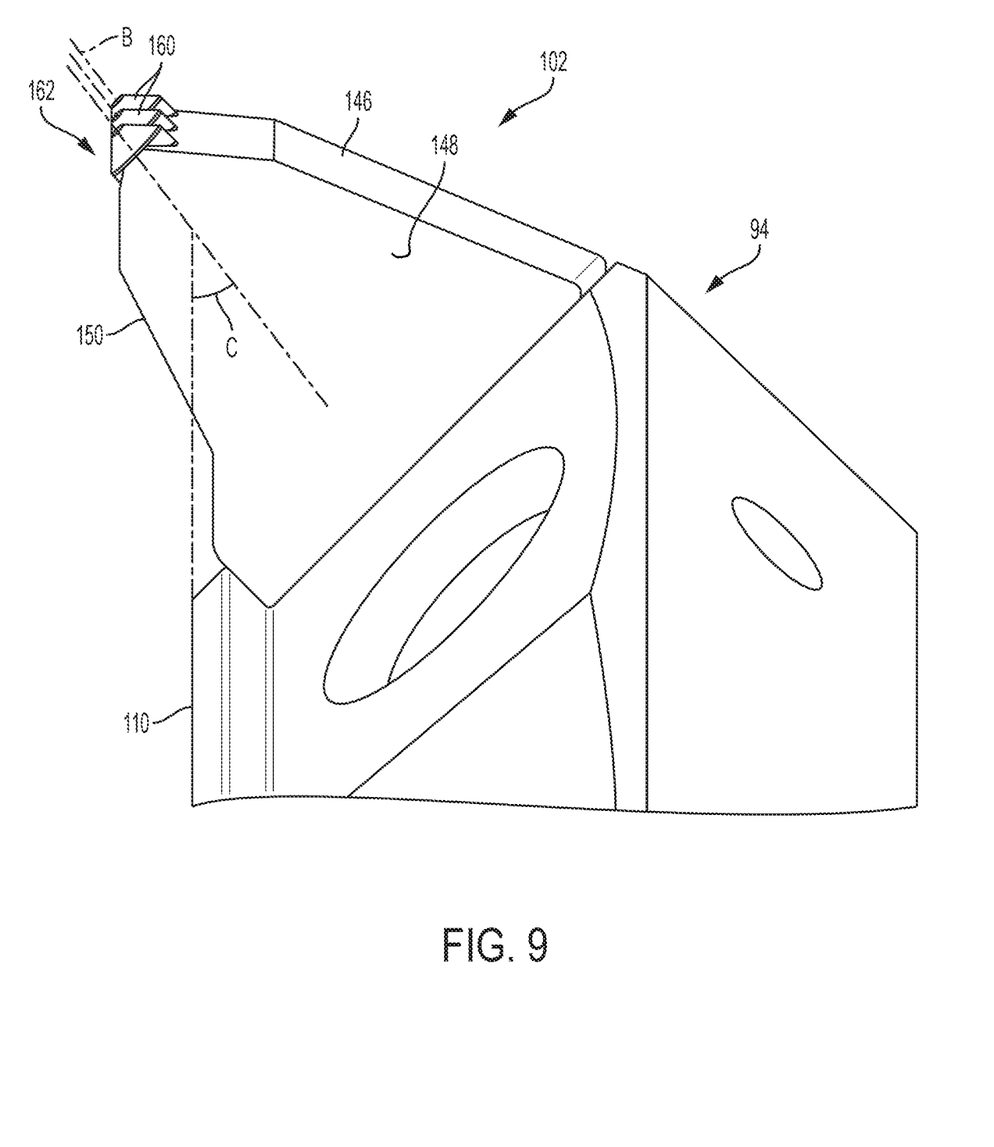
FIG. 9 is an enlarged side view of the cutting segment secured to the main support of FIG. 8.
Figure 10:
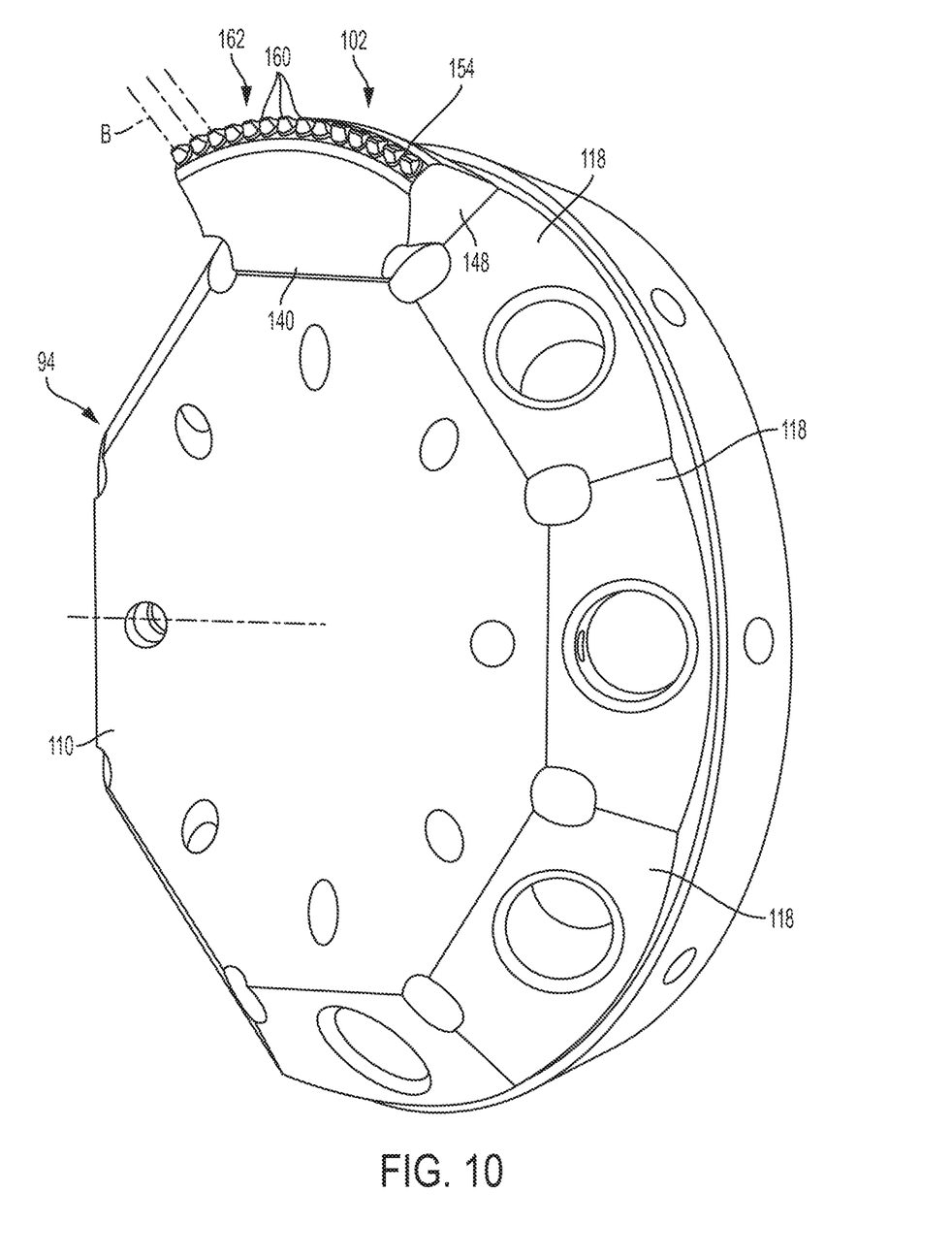
FIG. 10 is a perspective view of a cutting segment secured to the main support of FIG. 8.

As shown in FIGS. 8 and 9, in the illustrated embodiment the cutting bits 162 are spaced apart at regular intervals along the peripheral edge 154. A longitudinal axis B (FIG. 9) of the cutter bits 162 is oriented at an angle relative to a plane defined by the end surface 110 of the main support 94. In particular, an angle C (FIG. 9) of between approximately 0 degrees and approximately 90 degrees is formed between the end surface 110 and the longitudinal axis B of each cutting bits 162. In some embodiments, the end surface 110 is substantially perpendicular to the longitudinal axis A of the cutter head 22. In addition, the cutting bits 162 are positioned such that the cutting edge is oriented in a direction that is radially outward from the longitudinal axis A of the cutting head 22.

Figure 11:
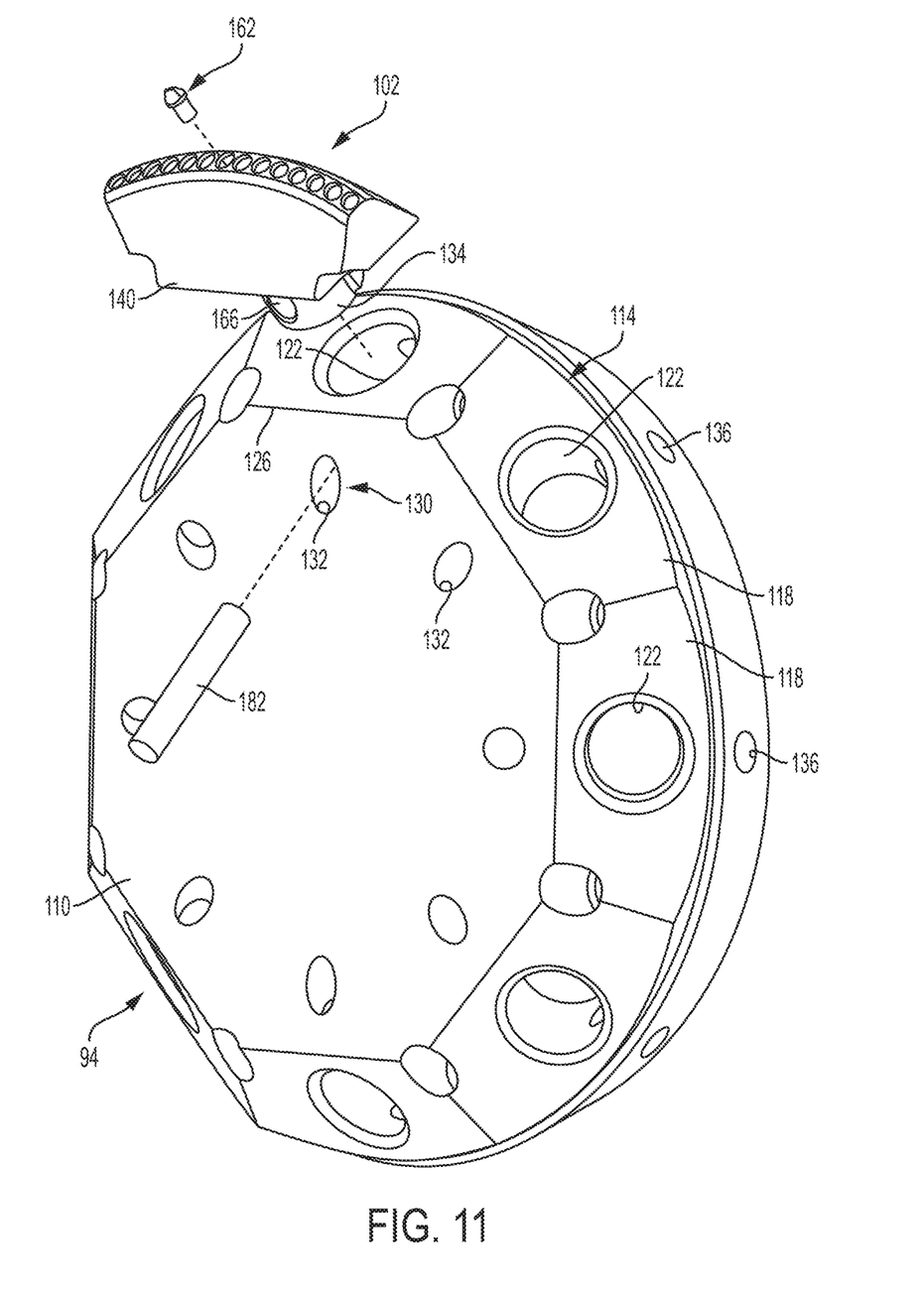
FIG. 11 is an exploded view of the main support of FIG. 8 and one cutting segment.
Figure 12:
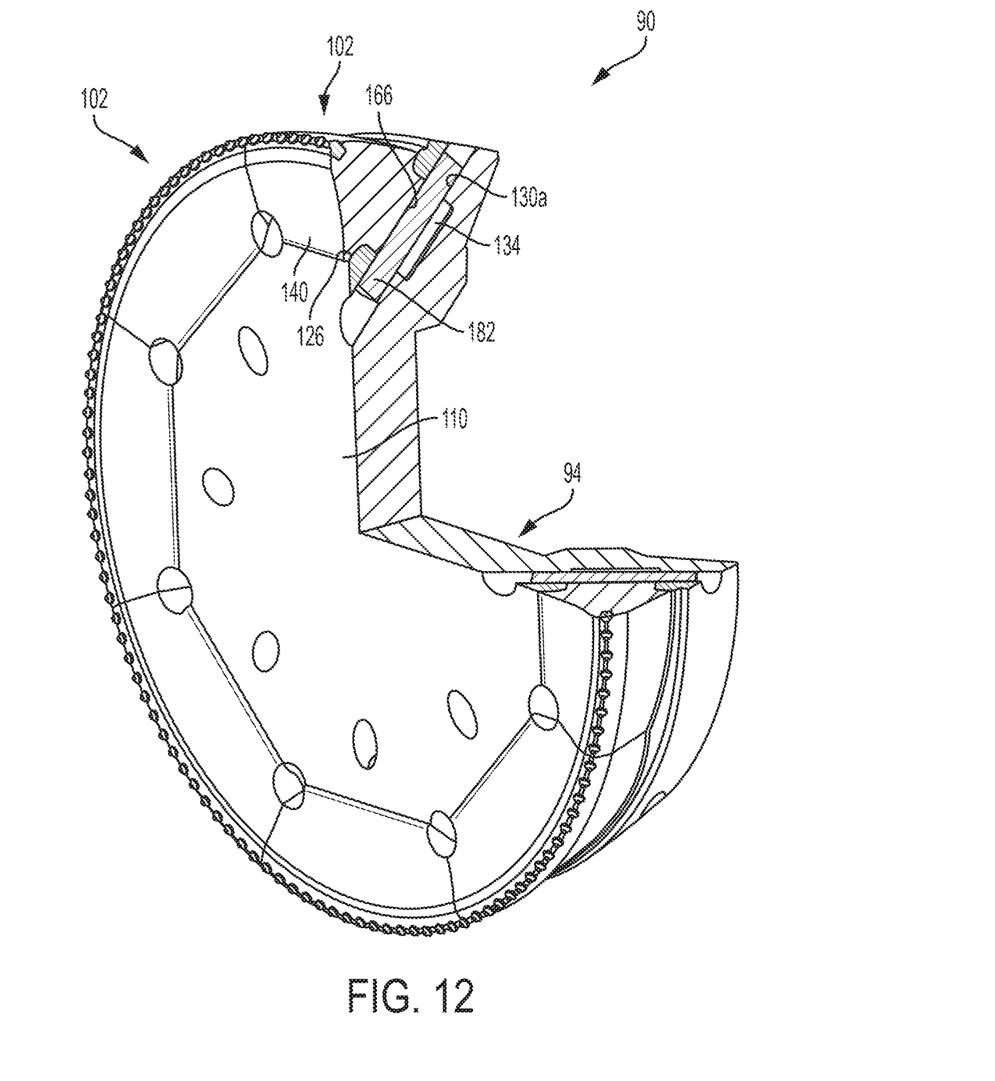
FIG. 12 is a partial cross-section view of the cutting disc of FIG. 5.

As shown in FIGS. 11 and 12, the coupling protrusion 134 is inserted into the cutter segment-receiving slot 122 and positioned such that the aperture 166 of the protrusion is aligned with the retention feature 130. The ledge 140 of the cutting segment 102 abuts the shoulder 126 of the main support 94, further ensuring that the protrusion 134 is properly aligned within the slot 122. In the illustrated embodiment, the cutting segment 102 is secured by a retainer or fastener 182 (e.g., a pin, a bolt, a screw, etc.) through the bore of the retention feature 130 along axis D. The fastener extends through the aperture 166 of the cutting segment 102 and through a portion of the main support 94, thereby locking the cutting segment 102 to the main support 94 (FIG. 12).

In other embodiments, the cutting segment 102 may be secured to the main support 94 in another manner. For example, locking plates, clips, bolted connections, keyways, splines, extrusions, eccentric clamping, spring clamping, hydraulic clamping, interference fits, frictional fits, expansion interfaces, and/or tapered interfaces may be used. The retention feature 130 facilitates locking/attaching the cutting segment 102 to the main support 94, and can also provide additional advantages such as assisting in alignment of the cutting segment 102 and drawing the cutting segment 102 into abutment with the main support 94 to ensure a secure coupling.

In the illustrated embodiment, the coupling between the cutting segment 102 and the main support 94 enables and, in many cases, optimizes the load transfer to the main support 94 when the cutter bits 162 engage the rock face. For example, the engagement between the shoulder 126 of the main support 94 and the cutting segment 102 assists in preventing rotation of the cutting segment 102 about the protrusion 134. This engagement also provides a larger load surface for distributing the load exerted on the cutting segment 102, which in turn minimizes the load that is transferred to the retainer 182 and enhances longevity of the cutting segments 102 and the retainer 182.

In operation, the cutting disc assembly 58 is driven into engagement with a rock face. In the illustrated embodiment, the exciter mass 70 is driven by the motor 78 to cause eccentric oscillation of the cutting head 22. The cutting head 22 may move about a wrist joint of the boom 18 (FIG. 1), while the cutting disc assembly 58 is freely rotatable relative to the mining machine 10. The combination of free rotation of the cutting disc assembly 58 and oscillation enables efficient removal of rock from the rock face when forces are transmitted to the rock face by the cutter bits 162.

The removable cutting segments 102 permit individual cutting segments 102 to be replaced when those segment become damaged or degraded rather than requiring replacement of an entire cutting member 96 or cutting disc 90. In addition, the cutting segments 102 can become 'modular' in that segments may be removed and replaced to customize the cutting disc assembly 58 to suit a particular application. For example, cutting segments 102 of different materials or cutting segments 102 having different cutter bits 162 may be used in different applications (e.g., different rock face compositions, different environmental conditions, etc.). In addition, the effective cutting dimension of the cutting disc 90 can be modified without changing the main support 94, for example by replacing the cutting segments 102 with smaller or larger cutter segments on the main support 94, or by replacing the cutter segments including a peripheral edge having a different diameter.

Although various aspects have been described in detail with reference to certain embodiments, variations and modifications exist within the scope and spirit of one or more independent aspects as described. Various features and advantages are set forth in the following claims.

What is claimed is:

1. A cutting device for engaging a rock face, the cutting device comprising:
    a disc body supported for rotation about an axis of rotation, the disc body including a plurality of peripheral surfaces, each of the peripheral surfaces oriented in a plane at an oblique angle relative to the axis of rotation; and
    a plurality of peripheral portions removably secured to the disc body, each of the peripheral portions engaging an associated one of the peripheral surfaces, each of the peripheral portions including a plurality of cutting bits positioned on a peripheral edge, the peripheral edge of each peripheral portion aligned with the peripheral edges of adjacent peripheral portions.

2. The cutting device of claim 1, wherein each of the peripheral portions is independently secured to the disc body.

3. The cutting device of claim 1, wherein the disc body includes a plurality of slots, wherein each of the peripheral portions includes a protrusion positioned within an associated one of the slots.

4. The cutting device of claim 3, wherein each protrusion is secured within the associated one of the slots by a fastener extending through the protrusion and through at least a portion of the disc body.

5. The cutting device of claim 1, wherein the peripheral portions are positioned around the axis of rotation and the peripheral edges form a round profile extending around the axis of rotation, the cutting bits of the peripheral portions positioned in a common cutting plane.

6. The cutting device of claim 1, wherein each peripheral portion includes a first end and a second end, wherein the peripheral portions are positioned in an end-to-end relationship around the axis of rotation, the first end of one peripheral portion being positioned adjacent the second end of an adjacent peripheral portion.

7. The cutting device of claim 1, wherein each peripheral portion extends through an angle about the axis of rotation, the angle being between approximately 30 degrees and approximately 120 degrees.

8. The cutting device of claim 1, wherein each peripheral portion includes a plurality of bores positioned on the peripheral edge, each of the cutting bits being positioned within an associated one of the bore.

9. The cutting device of claim 8, wherein each peripheral portion further includes a plurality of extraction holes, each of the bores being in communication with an associated extraction hole to facilitate removal of the cutting bits from the peripheral portion.

10. A cutting head for engaging a rock wall, the cutting head comprising:
    a boom configured to be supported on a frame;
    a drive mechanism; and
    a cutting device supported on the boom and driven by the drive mechanism, the cutting device including,
        a disc body supported for rotation about an axis of rotation, the disc body including a plurality of peripheral surfaces, each of the peripheral surfaces oriented in a plane at an oblique angle relative to the axis of rotation, and
        a plurality of peripheral portions removably secured to the disc body, each of the peripheral portions engaging an associated one of the peripheral surfaces, each of the peripheral portions including a plurality of cutting bits positioned on a peripheral edge, the peripheral edge of each peripheral portion aligned with the peripheral edges of adjacent peripheral portions.

11. The cutting device of claim 10, wherein each of the peripheral portions is independently secured to the disc body.

12. The cutting device of claim 10, wherein the disc body includes a plurality of slots, wherein each of the peripheral portions includes a protrusion positioned within an associated one of the slots, each protrusion being secured within the associated one of the slots by a fastener extending through the protrusion and through at least a portion of the disc body.

13. The cutting device of claim 10, wherein the peripheral portions are positioned around the axis of rotation and the peripheral edges form a round profile extending around the axis of rotation, the cutting bits of the peripheral portions positioned in a common cutting plane.

14. The cutting device of claim 10, wherein each peripheral portion includes a first end and a second end, wherein the peripheral portions are positioned in an end-to-end relationship around the axis of rotation, the first end of one peripheral portion being positioned adjacent the second end of an adjacent peripheral portion.

15. The cutting device of claim 10, wherein each peripheral portion extends through an angle about the axis of rotation, the angle being between approximately 30 degrees and approximately 120 degrees.

16. A cutting device for engaging a rock face, the cutting device comprising:
    a disc body supported for rotation about an axis of rotation, the disc body including a first surface and a second surface, the first surface oriented orthogonally with respect to the axis of rotation, the first surface positioned adjacent the axis of rotation, the second surface radially spaced apart from the axis of rotation; and
    a cutting member supported on the second surface of the disc body and radially spaced apart from the axis of rotation, the cutting member including a peripheral edge and a plurality of cutting bits positioned along the peripheral edge, the peripheral edge having a round shape, the cutting member formed as a plurality of cutting portions independently and removably secured to the disc body, each of the cutting portions supporting some of the cutting bits.

17. The cutting device of claim 16, wherein the disc body includes a plurality of slots, wherein each of the cutting portions includes a protrusion positioned within an associated one of the slots, each protrusion being secured within the associated one of the slots by a fastener extending through the protrusion and through at least a portion of the disc body.

18. The cutting device of claim 16, wherein the cutting bits are positioned in a common cutting plane.

19. The cutting device of claim 16, wherein each cutting portion includes a first end and a second end, wherein the cutting portions are positioned in an end-to-end relationship to form the cutting member, the first end of one cutting portion being positioned adjacent the second end of an adjacent cutting portion.

\* \* \* \* \*